(12) United States Patent
Anderson

(10) Patent No.: US 6,740,817 B1
(45) Date of Patent: May 25, 2004

(54) APPARATUS AND METHOD TO CONTAIN A CORD

(76) Inventor: Rosamond Anderson, 4210 Garden Ridge Rd., Crestwood, KY (US) 40014

( * ) Notice: Subject to any disclaimer, the term of this patent is extended or adjusted under 35 U.S.C. 154(b) by 36 days.

(21) Appl. No.: 09/648,458

(22) Filed: Aug. 28, 2000

Related U.S. Application Data

(60) Provisional application No. 60/086,438, filed on May 22, 1998.

(51) Int. Cl.$^7$ .................................................. H01B 7/00
(52) U.S. Cl. ...................... 174/135; 174/68.1; 174/68.3; 174/137 R; 174/138 R; 206/328
(58) Field of Search .................. 174/135, 68.1, 174/68.3, 137 R, 138 R; 439/501; 206/328, 388; 24/129 R

(56) References Cited

U.S. PATENT DOCUMENTS

| | | | | |
|---|---|---|---|---|
| 4,475,649 A | * | 10/1984 | Haarbosch | 174/135 |
| 4,868,967 A | * | 9/1989 | Holt et al. | 174/135 |
| 4,979,614 A | * | 12/1990 | Ruhaut | 174/135 |
| D374,174 S | * | 10/1996 | McClellan | D13/154 |
| 5,658,648 A | * | 8/1997 | Doerr et al. | 428/195 |
| 6,301,752 B1 | * | 10/2001 | Koppang | 24/115 M |

* cited by examiner

*Primary Examiner*—Chau N. Nguyen
*Assistant Examiner*—Jinhee J Lee
(74) *Attorney, Agent, or Firm*—Henry W. Cummings

(57) ABSTRACT

A cord storage/organizer includes a container having paired, opposed open ends having an opposed opening of a size sufficient for urging insertion and removal of the cord. The container includes a continuous internal wall for urging retention of the cord. The internal wall further includes a first wall thickness at the open ends that is less than a second wall thickness located in a middle region of said container. The container further includes a label area disposed on the outer periphery of the arcuate continuous wall allowing identification of the cord stored in the container. The container also includes notches on at least one of said open ends of sufficient size to enable the user to grab the plug head and pull the cord out of the cord container with ease. The container includes at least one flexible baffle located on the inner portion of the side wall for urging the cord to remain in the stored condition.

23 Claims, 4 Drawing Sheets

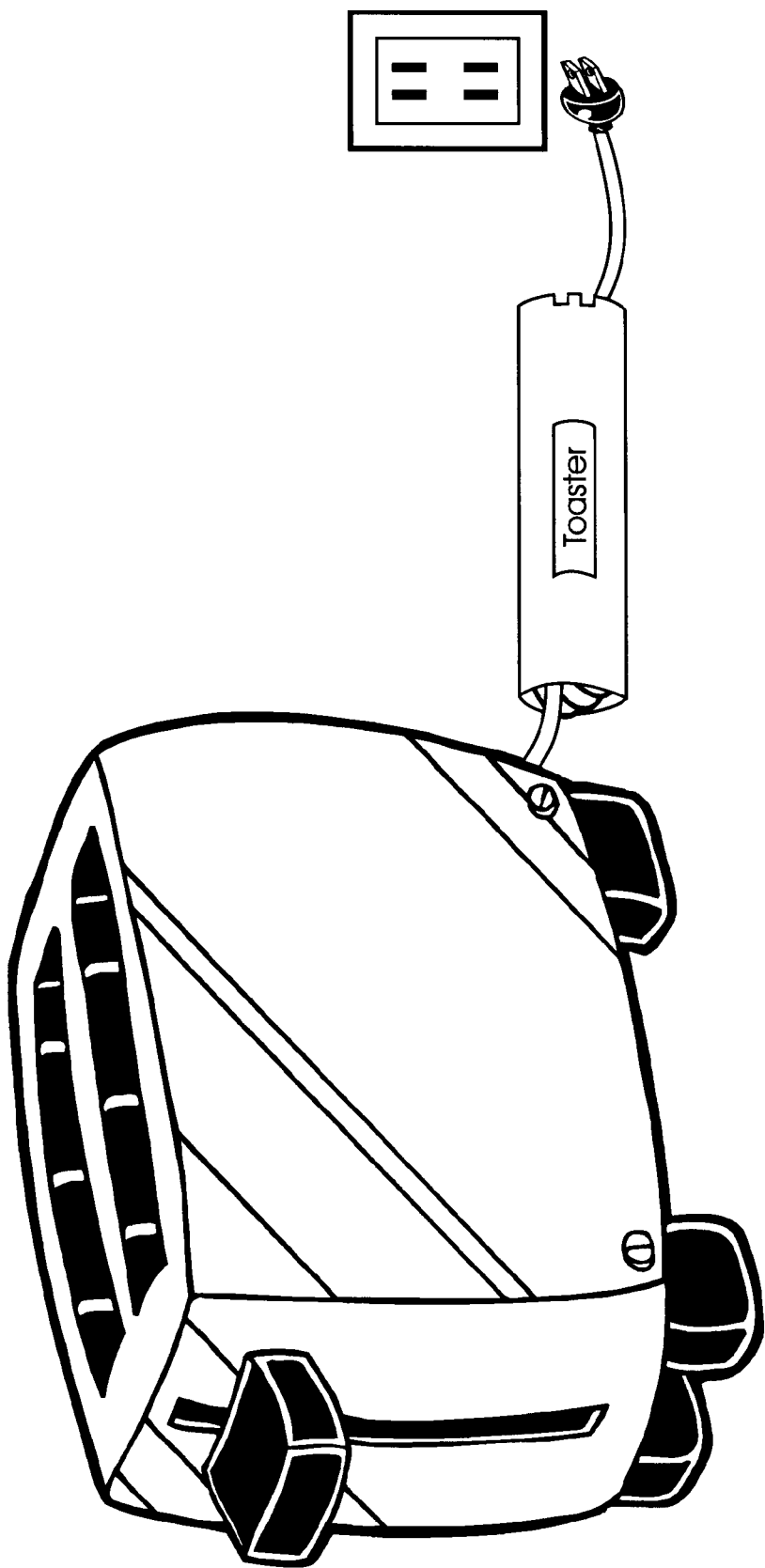

APPARATUS AND METHOD TO CONTAIN A CORD

REFERENCE TO RELATED APPLICATION

This application claims the Benefit of provisional application Ser. No. 60/086,438, filed May 22, 1998.

FIELD OF THE INVENTION

This invention relates to a method and apparatus for storing and organizing electrical cords.

BACKGROUND OF THE INVENTION

The proliferation of electrical devices deemed to be essential in our everyday life is staggering. For example, can one imagine a life without lamps, televisions, VCRs, stereos, computers, fax machines, printers, answering machines, space heaters, room fans, coffee pots, blenders, food processors, mixers, can openers, electric tools and many, many other electrical devices too numerous to mention. Some of the aforementioned electrical devices are equipped with permanent electrical cords. Other electrical devices are equipped with detachable electrical cords. Usually these detachable electrical cords are stored when not in use.

The proliferation of these electrical devices has indeed made our daily life more enjoyable and some would even say less stressful. However the increased use of these electrical devices having attached or detached electrical cords in the home and work place can produce a plethora of problems. For instance with a detachable electrical cord, it can be a problem for the user to identify a needed electrical cord being stored. Stored electrical cords also become tangled, thereby increasing the likelihood of damage to the cord.

Elongated electrical cords can also produce problems. For instance, a plurality of electrical cords inserted into an electrical outlet on a wall can produce a tripping hazard. These elongated cords are also a magnet for dirt and dust. One of the most frustrating situation arises when a person has to somehow identify a particular electrical cord from the maze of multiple, intertwined electrical cords found at an electrical outlet.

In the kitchen area, many small kitchen appliances such as hand-held mixers, electric frying pans, electric woks, indoor grills and food processors have removable electrical cords. Usually these items are not kept on the kitchen countertop area, thereby necessitating the storage of the appliance and its accompanying electrical cord. After the small kitchen appliance is used, its electrical cord is removed and placed for storage in a kitchen drawer, a container or the like. It can be appreciated that many electrical cords, including extension cords, can accumulate in this storage area. Therefore when one goes to retrieve the electrical cord that is needed to power a particular appliance, it can be difficult to identify the correct electrical cord needed. Additionally, many times these multiple electrical cords are tangled together, increasing the likelihood of damage to the cords. The mass of tingled electrical cords also contributes to the frustration level of the person trying to use the small appliance because he or she must first untangle the intertwined cords before the appliance can be used.

Similar types of problems and frustrations can be experienced in a workshop area. Usually within a workshop area there are a plurality of electrical tools having detachable electrical cords. The electrical cords are usually stored in an area such as a drawer, a tool box, a storage container or the like. It is very difficult and time consuming to identify the appropriate electrical cord needed to power the desired electrical tool. Moreover it is not good for the electrical cord to be in a prolonged tangled state with other electrical cords.

The usual workplace nowadays includes a computer having some, if not all of the following components—a hard drive, a monitor, a printer, a scanner and a telephone line. Some of these components need their own source of electrical power while others do not. However all the components are accompanied by a plurality of cords and cables having various lengths and widths. This plurality of cords and cables found in close proximity to each other increases the likelihood that tangling will result. As pointed out above, this occurrence is not favorable because the tangling increases the risk of damage to the cord. Moreover, if a troubleshooting situation arises whereby the user wants to find a particular cable or cord, it is very difficult for the user to identify the particular cord he or she is looking for. He or she must go through the time consuming process of first correctly identifying the needed cord and then untangling it form the other cords.

Another area where a variety of different cables and cords can be found is the area behind a television having a VCR attached thereto or behind a stereo system having many components. This plurality of cords and cables found in close proximity to each other increases the likelihood that tangling will result. This occurrence is not favorable because the tangling increases the risk of damage to the cords and or cables. Moreover, if a troubleshooting situation arises whereby the user wants to find a particular cable or cord, it is very difficult for the user to identify the particular cord or cable he or she is looking for. Additionally, the identification of the individual cords and cables would help in the set-up and breakdown of the stereo and multimedia systems.

Additionally, the elongated nature of most electrical cords can produce some problems. For instance, an elongated cord plugged into an electrical outlet can pose a tripping hazard. These elongated electrical cords also attract dirt and dust. A device that would shorten these cords would alleviate these problems.

Another area where one sees an increased use of electrical devices is in an automobile. These devices, usually power the automobiles cigarette lighter, including, but are not limited to car phones, electric coolers, miniature televisions and radar detectors. The excess length of cord found on the devices can pose a threat to the driver of the car because the excess cord can get tangled in the gas, brake and or the clutch pedals, thereby inviting an accident.

Yet another situation posing a cord containing problem is the storage of seasonal items such as room fans, space heaters and electrical blankets. When one stores these items in close proximity to each other, the likelihood that one or more of these heavy items will be placed on top of the cord for a prolonged period of time is increased, possibly resulting in damage to the cord. It would therefore be advantageous to store the cord in a protected environment close to its electrical device.

U.S. Pat. Nos. 2,867,681; 3,126,444; 3,337,681; 3,823, 251; 3,889,044; 4,156,795; 4,902,852; 5,185,791 and 5,304, 736 disclose structure for housing electrical wire and cords with structure for holding the wires and cords in place within the housing. In U.S. Pat. No. 3,433,889 the wires are folded within the housing. U.S. Pat. No. 3,259,680 discloses a tapered cylindrical hosing for electrical cords.

U.S. Pat. Nos. 2,001,491; 3,088,237; 3,212,207; 3,474, 559; 3,551,541; 4,656,767 and 4,882,116 disclose placing information concerning the wires on the external surface of the housing.

SUMMARY OF THE INVENTION

A cord storage/organizer includes a container having paired, opposed open ends having an opening of a size sufficient for urging insertion and removal of the cord. The container includes a continuous internal wall for urging retention of the cord. The internal wall further includes a first wall thickness at the open ends that is less than a second wall thickness located in a middle region of said container. The container further includes a label area disposed on the outer periphery of the arcuate continuous wall allowing identification of the cord stored in the container. The container also includes at least one notch on at least one of said open ends of sufficient size to enable the user to grab the plug head and pull the cord out of the cord container with ease. The container includes at least one flexible baffle located on the inner portion of said side wall for urging the cord to remain in the stored condition. Use includes winding a cord connected to an electrical plug into a small bundle, inserting the said wound-up cord into the cord container, and inserting the cord's electric plug into an area directly adjacent one of the open ends into the notch area for storage.

THE DRAWINGS

FIG. 8 is a perspective view illustrating the use of the container and the cord with a toaster electrical appliance.

DESCRIPTION OF PREFERRED EMBODIMENTS

Figure 1:
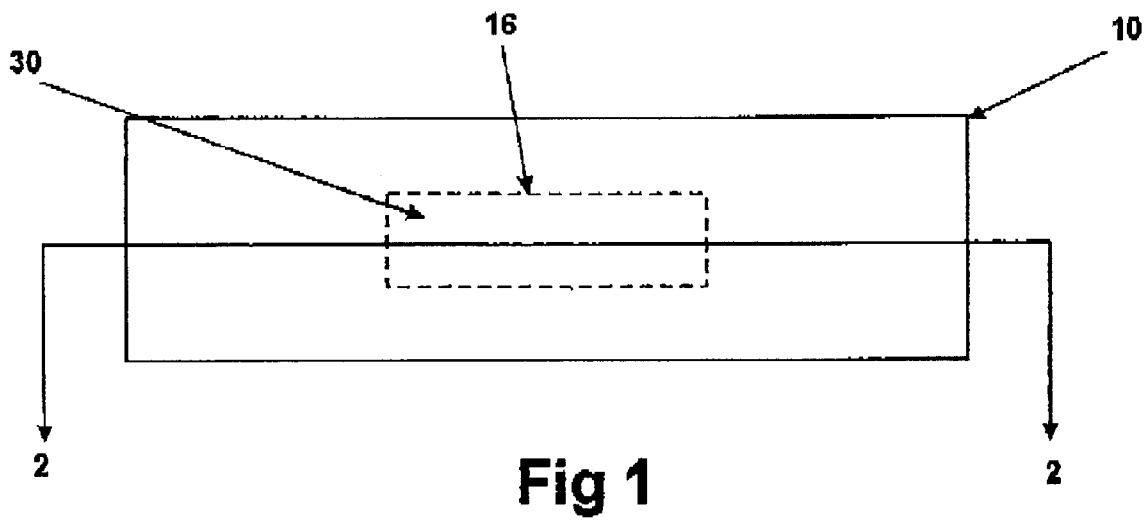
FIG. 1 is a side elevation view of one embodiment of the present invention.
Figure 2:
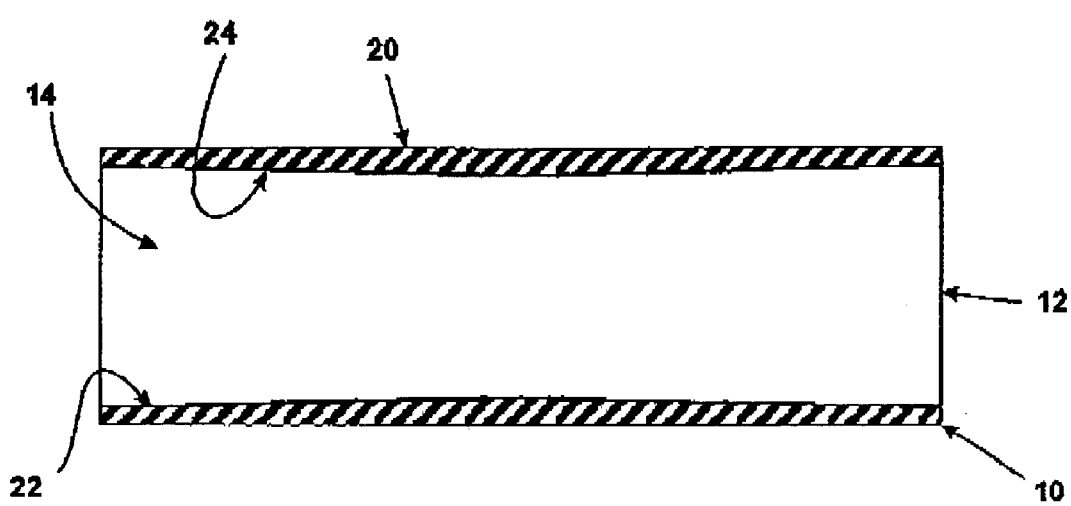
FIG. 2 is a sectional view looking in the direction of the arrows along the line 2—2 in FIG. 1.
Figure 3:
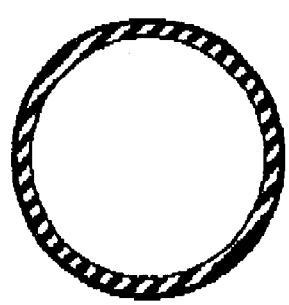
FIG. 3 is an end view of FIG. 2.

The cord storage/organizer of the present invention solves many or all of above mentioned problems. FIG. 1 illustrates one embodiment of the present invention. This embodiment comprises container 10 for the storage and or housing of an elongated cord. It may have a circular, square, rectangular elliptical or any other convenient cross section. The cord container of the present invention can be manufactured from any type of material known in the art that does not conduct an electrical current. In the preferred embodiment, the chosen material of construction is plastic.

The container includes paired, opposed open ends 12, 14, for urging insertion and removal of the cord. In the preferred embodiment, the open ends are about 1 to 2 inches in diameter. In the preferred embodiment, the container is about 4 to 5 inches in length.

The container also comprises a continuous arcuate wall 20 for urging retention of the cord. This arcuate wall further includes a first wall thickness 22 at the open ends 12, 14 of the container that is less than a second wall thickness 24 at the middle region of the container. In the preferred embodiment, the thickness of the container at the ends is about 0.25 to 0.50 inches and in the middle about 0.50 to 1.0 inches.

The cord container of the present invention further includes a label area 30 disposed on the outer periphery of the arcuate continuous wall allowing identification of the cord stored in the container. In the preferred embodiment, the label area is located around the midsection 16 of the cord container and may be square, rectangular, circular or any other convenient shape. As an example for a rectangular embodiment the area preferably is 1–3 inches by 0.5 to 1.5 inches.

Figure 4:
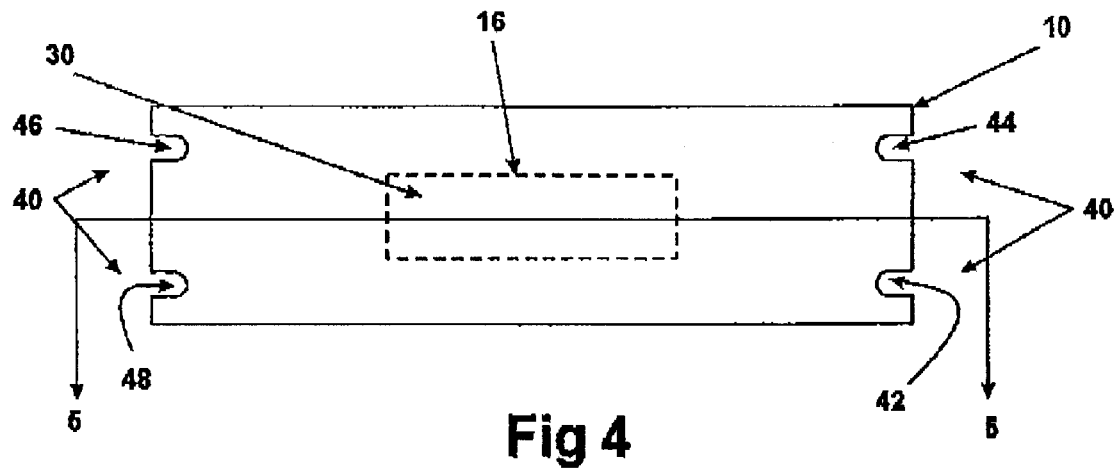
FIG. 4 is a side elevation view of another embodiment of the present invention.

As shown in FIG. 4, in the preferred embodiment the cord storage/organizer of the present invention can also include notche means 40.

Figure 7:
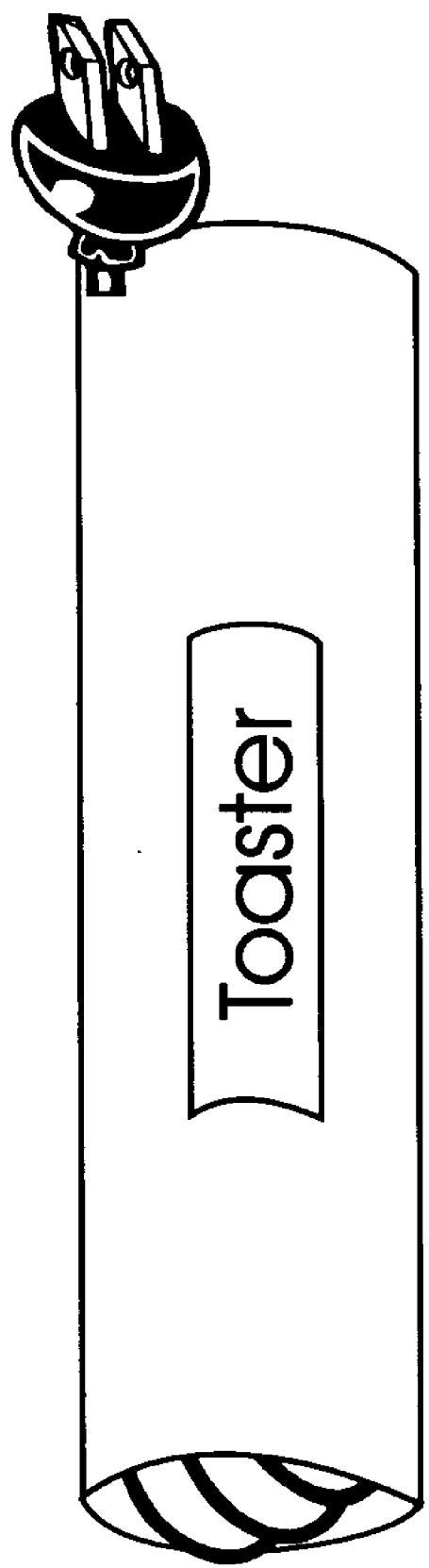
FIG. 7 is a perspective view illustrating the cord located within the cord container.

One or more notches may be provided. These notches in cross section may be square, rectangular, circular elliptical or any other convenient shape. In one embodiment for a square notch in cross section, it may extend 1/16 to 1/4 of -1- an inch deep and 1/16 to 1/4 inches square in cross section. In use the area directly underneath the cord's electric plug is inserted securely into this notch area, as shown in FIG. 7. This allows the user to grab the plug head and pull the cord out of the cord container with ease.

However in an alternate embodiment of the present invention can be made without the notches and still perform the function of effectively containing and storing an elongated cord.

Figure 5:
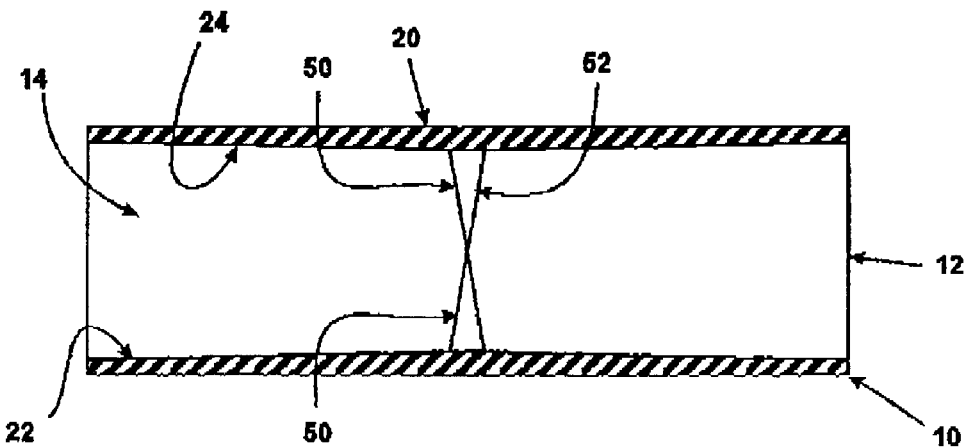
FIG. 5 is a sectional view looking in the direction of the arrows along the line 5—5 in FIG. 4.
Figure 6:
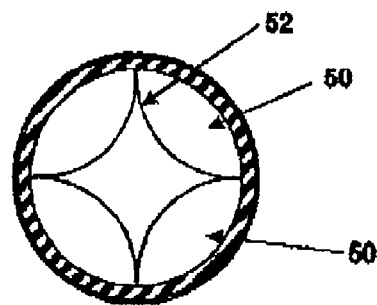
FIG. 6 is an end view of FIG. 5.

Another alternate embodiment of the invention is illustrated in FIGS. 4–6. In this alternate embodiment the cord container also has a continuous arcuate wall and paired, opposed open ends 12 and 14. Also, this alternate embodiment also includes a flexible baffle means 50 disposed on the inner portion of the arcuate side wall for urging the cord to remain in the stored condition. The baffle means include at least one baffle 52, and is preferably made from a flexible plastic. The baffle means may be formed integrated as part of the actual body of the container, or installed separately after the container is formed.

The cord container device of the present invention is used in the following way. The area directly underneath the cord's electric plug is inserted securely into this notch area. This allows the user to grab the plug head and pull the cord out of the cord container with ease, as shown in FIG. 7.

To store a detachable electric cord, the user simply winds the cord into a small circle. He or she then inserts the wound-up cord into the cord container at the first or second open end. The area directly underneath the cord's electric plug is inserted securely into notch area. This allows the user to grab the plug head and pull the cord out of the cord container with ease. The identity of the cord to be stored is written on a label and the label is then placed on the outer peripheral of the cord container. The cord is now ready to be stored in a drawer, a container or the like.

To shorten and identify a cord attached to a particular electrical device, the user winds the cord into a small circle and urges it into the cord container at the first open end. He or she then removes the plug head of the electrical cord from the second open end. The plug end is pulled until there is sufficient cord length to reach an electrical outlet as shown in FIG. 8. The identity of the cord to be shortened is written on a label and the label is then placed on the outer periphery of the cord container.

What is claimed is:

1. A cord holder for receiving and holding a bundled cord such as an electrical cord or wiring comprising: an elongate cylindrical body member having first and second opposite open ends and a longitudinal bore therethrough defining a longitudinal interior passageway through the body member, the passageway having a first interior diameter at the first open end thereof, a second interior diameter at the second open end thereof, and a third interior diameter between the opposite open ends, wherein the third interior diameter is smaller than the first and second interior diameters, and the third interior diameter is uniform in cross section transverse to the longitudinal axis through said passageway, wherein said holder of the present invention also include notch means disposed on the first open end and the second open end of said cylindrical body member, each of said notch means being of sufficient size to enable the user to grab the plug head and pull the cord out of the cord holder with ease.

2. The cord holder of claim 1 wherein the first interior diameter is substantially equal to the second interior diameter.

3. The cord holder of claim 2 wherein the third interior diameter is near the center of the passageway between the opposite ends.

4. The cord holder of claim 3 in which the interior wall of the passageway is curved smoothly and gradually radially inwardly in the direction from the opposite ends of the passageway toward the third interior diameter to define a passageway having an interior wall that is a smooth and gradual surface.

5. The cord holder of claim 1 made of flexible plastic.

6. A cord holder according to claim 5 wherein the material of construction is plastic.

7. The cord holder of claim 1 wherein the interior surface of the passageway defines a smoothly and continuously radially inwardly curved wall extending from the opposite ends of the passageway axially toward the center point of the passageway between the opposite ends thereof.

8. A cord holder according to claim 7 wherein a label area is located around the midsection of said holder and may be square, rectangular, circular, elliptical or other convenient cross section.

9. A cord holder according to claim 8 wherein said label area for a rectangular area is about 1–3 inches by about 0.5 to 1.5 inches.

10. A cord holder according to claim 1 wherein said open ends are about 1 to 2 inches in smallest dimension.

11. A cord holder according to claim 10, wherein the thickness of the holder at the ends is about 0.25 to 0.50 inches and in the middle about 0.50 to 1.0 inches.

12. A cord holder according to claim 1 wherein said body member is about 4 to 5 inches in length.

13. A cord holder according to claim 1 wherein said body member further includes a label area disposed on said body member allowing identification of the cord stored in the container.

14. A cord holder according to claim 13 wherein said notch means are provided on said first open wherein said notch extends $1/16$ to $1/4$ of an inch deep.

15. A cord holder according to claim 14 wherein the notch is a square notch.

16. A cord holder according to claim 15 wherein said square notch is from $1/16$ to $1/4$ inches square in crossection.

17. A cord holder according to claim 1 wherein flexible baffle means are located on an inner portion of said side wall for urging the cord to remain in the stored condition.

18. A cord holder according to claim 17 wherein said flexible baffle means includes at least one baffle.

19. A cord holder according to claim 18 wherein said flexible baffle means is made from a flexible plastic.

20. A method of storing a detachable electric cord connected to an electrical plug comprising: winding said cord into a small bundle; inserting the said wound-up cord into a cord container having an elongate cylindrical body member having first and second opposite ends and a longitudinal bore therethrough defining a longitudinal interior passageway through the body member, the passageway having a first interior diameter at the first end thereof, a second interior diameter at the second end thereof, and a third interior diameter between the opposite ends, wherein the third interior diameter is smaller than the first and second interior diameters, and the third interior diameter is uniform in cross section transverse to the longitudinal axis through said passageway, a first open end and a second open end; and inserting the cord's electric plug into an area directly adjacent to one of said first and second open ends, wherein said holder of the present invention also include notch means disposed on the first and second end of said cylindrical body member, each of said notch means being of sufficient size to enable the user to grab the plug head and pull the cord out of the cord holder with ease.

21. A method according to claim 20 including placing an identity of the cord on the outer periphery of the cord container.

22. A method according to claim 21 including placing said identity on a label and placing said label on the outer periphery of the cord container.

23. A method according to claim 20 including storing said container for future use.

* * * * *